US009669463B2

(12) United States Patent
Enomura

(10) Patent No.: US 9,669,463 B2
(45) Date of Patent: Jun. 6, 2017

(54) METHOD FOR PRODUCING MICROPARTICLES BY GROWING A PRECIPITATED SEED MICROPARTICLE

(75) Inventor: Masakazu Enomura, Izumi (JP)

(73) Assignee: M. TECHNIQUE CO., LTD., Izumi-shi (JP)

( * ) Notice: Subject to any disclaimer, the term of this patent is extended or adjusted under 35 U.S.C. 154(b) by 278 days.

(21) Appl. No.: 14/381,848

(22) PCT Filed: Feb. 29, 2012

(86) PCT No.: PCT/JP2012/055071
§ 371 (c)(1),
(2), (4) Date: Aug. 28, 2014

(87) PCT Pub. No.: WO2013/128592
PCT Pub. Date: Sep. 6, 2013

(65) Prior Publication Data
US 2015/0030760 A1     Jan. 29, 2015

(51) Int. Cl.
*C30B 7/14* (2006.01)
*B22F 9/16* (2006.01)
(Continued)

(52) U.S. Cl.
CPC .............. *B22F 9/16* (2013.01); *B01D 9/0054* (2013.01); *B01D 9/0063* (2013.01);
(Continued)

(58) Field of Classification Search
CPC ..... B22F 9/16; B22F 9/24; B01D 9/00; B01D 9/005; B01D 9/0054; B01D 9/0063;
(Continued)

(56) References Cited

U.S. PATENT DOCUMENTS 3,831,907 A * 8/1974 Claes .................. B01F 3/088
366/142
2003/0201427 A1   10/2003 Hori et al.
(Continued)

FOREIGN PATENT DOCUMENTS

CN         101939093 A    1/2011
EP         2 177 294 A1   4/2010
(Continued)

*Primary Examiner* — Kenneth A Bratland, Jr.
(74) *Attorney, Agent, or Firm* — Birch, Stewart, Kolasch & Birch, LLP

(57) ABSTRACT

The invention addresses the problem of providing a method for producing microparticles. Provided is a method for producing microparticles. For the first process, seed microparticles are separated in a thin film fluid that forms between at least two processing surfaces, which are disposed facing each other, which can approach or separate from each other and at least one of which rotates relative to the other, and the fluid comprising the separated seed microparticles is discharged as a discharge fluid. Subsequently, for the second process, the separated seed microparticles are grown in the discharged discharge fluid to obtain the intended microparticles. Uniform and homogeneous microparticles are obtained as a result of the microparticle producing method comprising the two process.

19 Claims, 7 Drawing Sheets

(51) Int. Cl.
*B22F 9/24* (2006.01)
*B01J 19/18* (2006.01)
*B01F 7/00* (2006.01)
*C22B 3/00* (2006.01)
*B01D 9/00* (2006.01)

(52) U.S. Cl.
CPC ........ *B01D 9/0072* (2013.01); *B01F 7/00775* (2013.01); *B01J 19/1887* (2013.01); *B22F 9/24* (2013.01); *C22B 11/04* (2013.01); *C22B 23/04* (2013.01); *B01F 2215/0409* (2013.01); *B01F 2215/0431* (2013.01); *B01F 2215/0481* (2013.01); *B01J 2219/00076* (2013.01); *B01J 2219/00103* (2013.01)

(58) Field of Classification Search
CPC ........... B01D 9/0072; C30B 7/00; C30B 7/10; C30B 7/14; B01F 7/00775; B01F 2215/0409; B01F 2215/0431; B01F 2215/0481; B01J 19/1887; B01J 2219/00076; B01J 2219/00103; C22B 11/04; C22B 23/04
USPC .............................. 117/11, 68, 902, 912, 914
See application file for complete search history.

(56) References Cited

U.S. PATENT DOCUMENTS

| | | |
|---|---|---|
| 2009/0291228 A1 | 11/2009 | Cho et al. |
| 2010/0327236 A1* | 12/2010 | Enomura .................. B22F 9/24 252/512 |
| 2011/0042611 A1 | 2/2011 | Weller et al. |

FOREIGN PATENT DOCUMENTS

| | | |
|---|---|---|
| EP | 2 184 109 A1 | 5/2010 |
| GB | 2 377 661 A | 1/2003 |
| GB | 2 419 100 A | 4/2006 |
| JP | 2004-149902 A | 5/2004 |
| JP | 2006-193652 A | 7/2006 |
| JP | 2006-341232 A | 12/2006 |
| JP | 2008-188573 A | 8/2008 |
| JP | 2009-235474 A | 10/2009 |
| JP | 2011-514242 A | 5/2011 |
| WO | WO 2009/008393 A1 | 1/2009 |
| WO | WO 2009/101091 A1 | 8/2009 |
| WO | WO 2011/034165 A1 | 3/2011 |
| WO | WO 2012/014530 A1 | 2/2012 |

* cited by examiner (A)

(B)

(A)

(B)

METHOD FOR PRODUCING MICROPARTICLES BY GROWING A PRECIPITATED SEED MICROPARTICLE

The present invention relates to a method for producing microparticles.

Microparticles of a metal, an oxide, a medicine, a food stuff, a biological ingesting material such as a cosmetic, a pigment, and so on are wanted in a wide range of the industrial field.

In general, producing of microparticles is done by a batch method in which a poor solvent method, a crystallization method, or a reaction including reduction and oxidation is carried out by using a reaction vessel such as a flask, a beaker, a tank, and the like. However, in the batch process, concentration and temperature inside the reaction vessel tend to be inhomogeneous, whereby nuclear formation and nuclear growth taking place thereafter similarly tend to be inhomogeneous, resulting in wide distribution of the particle diameter of the microparticles thereby obtained. Because of this, as shown in Patent Document 1, to separate particles having homogeneous particle diameter, a method in which a substance capable of becoming a nucleus of the particle, a so-called seed crystal is added into the reaction vessel has been widely used. However, the method using the seed crystal naturally increases in the number of processes whereby increasing the production cost thereof; and on top of this, the diameter of the microparticles thereby obtained is dependent on the quality of the seed crystal capable of becoming the nucleus, so that this method requires cost and resources to obtain the homogeneous particles. On the other hand, a production method of microparticles by using a microreactor described in Patent Document 2 is provided; however, when a general microreactor is used for producing of microparticles, there are many problems, such as clogging of the flow path by the produced microparticles and difficulty in up-scaling. Therefore, a method for stably producing homogeneous and uniform microparticle with a low energy and a low cost has been eagerly wanted.

By Applicant of the present invention, a method for producing microparticles, such as those described in Patent Document 3, was provided in which a microparticle raw material fluid having a microparticle raw material dissolved therein is mixed with a separating solution to separate the said microparticles in a thin film fluid formed between at least two processing surfaces which are disposed in a position they are faced with each other so as to be able to approach to and separate from each other, at least one of which rotates relative to the other.

However, even in the case that the method shown in Patent Document 3 is used, if the nuclear formation and nuclear growth in the microparticles thereafter are tried to complete between the processing surfaces, there may be the necessity to reduce the flow amount for processing in order to secure the residence time of the microparticle raw material fluid and the separating solvent in between the processing surfaces; and especially, there has been a big problem of requiring a large equipment for the up-scaling.

PRIOR ART DOCUMENTS

Patent Document

Patent Document 1: Japanese Laid-Open Publication No. 2009-235474
Patent Document 2: Japanese Laid-Open Publication No. 2006-193652
Patent Document 3: International Patent Laid-Open Publication No. 2009/008393

In view of the above, present invention is object to provide a method for producing microparticle.

Means for Solving the Problems

An invention of a first claim of the present application provides a method for producing a microparticle wherein the method comprises at least two steps as following:

(I) a first step of separating a seed microparticle in a thin film fluid formed between at least two processing surfaces which are disposed in a position they are faced with each other so as to be able to approach to and separate from each other, at least one of which rotates relative to the other, whereby discharging a fluid which contains the seed microparticle thus separated as a discharge fluid, and (II) a second step of growing the separated seed microparticle in the discharge fluid whereby obtaining a prescribed microparticle.

In the present invention, the seed microparticle includes various microparticles which are separated in the thin film fluid, such as the microparticle nucleus which is generated in the thin film fluid formed between the at least two processing surfaces and the generated microparticle which has grown up to a certain size or is still growing in the thin film fluid formed between the processing surfaces.

In the present invention, in growth of the seed microparticle, the microparticle which is grown up merely in the particle diameter thereof by agglomeration of the microparticles among themselves is not included therein.

An invention of a second claim of the present application provides the method for producing a microparticle according to claim 1 wherein the prescribed microparticle is a crystalline microparticle and the seed microparticle is a crystalline microparticle.

An invention of a third claim of the present application provides the method for producing a microparticle according to claim 1 wherein the prescribed microparticle is a crystalline microparticle and the seed microparticle is a crystal nucleus.

An invention of a fourth claim of the present application provides a method for producing a microparticle wherein the method is to mix a raw material fluid in which at least one substance to be separated is dissolved or molecular dispersed in a solvent with a separating fluid to separate the substance to be separated, whereby separating the substance to be separated, the method comprises at least two steps as following:

(I) a first step in which the raw material fluid is mixed with the separating fluid in a thin film fluid formed between at least two processing surfaces which are disposed in a position they are faced with each other so as to be able to approach to and separate from each other, at least one of which rotates relative to the other, whereby separating a seed microparticle of the substance to be separated and discharging a fluid which contains the seed microparticle thus separated as a discharge fluid, and (II) a second step of growing the separated seed microparticle in the discharge fluid whereby obtaining a prescribed microparticle.

An invention of a fifth claim of the present application provides the method for producing a microparticle according to claim 4 wherein the raw material fluid is a metal fluid in which at least one metal and/or metal compound is dissolved in a solvent as the substance to be separated, the separating fluid is a reducing agent fluid which contains at least one reducing agent, and the prescribed microparticle is a metal microparticle.

An invention of a sixth claim of the present application provides the method for producing a microparticle according to any one of claims 1 to 5 wherein in the second step, into a tubular vessel having an introduction port in one end and a discharge port in other end, the discharge fluid is introduced from the introduction port, whereby growing the seed microparticle in the tubular vessel.

An invention of a seventh claim of the present application provides the method for producing a microparticle according to claim 6 wherein a mixer is installed inside the tubular vessel whereby mixing the fluids in the tubular vessel.

An invention of an eighth claim of the present application provides the method for producing a microparticle according to any one of claims 1 to 7 wherein in the second step, the discharge fluid is mixed with a fluid which contains a substance other than the substance of the seed microparticle separated, thereby separating the other substance on surface of the seed microparticle.

An invention of a ninth claim of the present application provides the method for producing a microparticle according to any one of claim 1 to 8 wherein the first step and the second step are executed continuously.

An invention of a tenth claim of the present application provides the method for producing a microparticle according to claim 6 or 7 wherein a temperature controlling mechanism is installed in the tubular vessel thereby controlling temperature of the fluid in the tubular vessel.

An invention of an eleventh claim of the present application provides the method for producing a microparticle according to any one of claims 6, 7, and 10 wherein by adjusting length and/or diameter of the tubular vessel, a residence time of the fluid in the tubular vessel is controlled.

According to mere one embodiment of the present invention, the present invention may be carried out as a method for producing a microparticle, wherein the method comprises:

a fluid pressure imparting mechanism for imparting a pressure to a fluid to be processed, a first processing member provided with a first processing surface of the at least two processing surfaces, a second processing member provided with a second processing surface of the at least two processing surfaces, and a rotation drive mechanism for rotating these processing members relative to each other; wherein each of the processing surfaces constitutes part of a sealed flow path through which the fluid to be processed under the pressure is passed, of the first and the second processing members, at least the second processing member is provided with a pressure-receiving surface, and at least part of this pressure-receiving surface is comprised of the second processing surface, the pressure-receiving surface receives a pressure applied to the fluid to be processed by the fluid pressure imparting mechanism thereby generating a force to move in the direction of separating the second processing surface from the first processing surface, the fluid to be processed under the pressure is passed between the first processing surface and the second processing surface which are disposed in a position they are faced with each other so as to be able to approach to and separate from each other, at least one of which rotates relative to the other, whereby the fluid to be processed forms a thin film fluid, and a seed microparticle is separated in this thin film fluid, whereby a first step of discharging a discharged fluid which contains the separated microparticle, and a second step of growing the separated seed microparticle in the discharge fluid whereby obtaining an intended microparticle.

According to mere another embodiment of the present invention, the present invention may be carried out as a method for producing a microparticle, wherein at least one fluid of the fluids to be processed passes through between both the processing surfaces while forming the thin film fluid, an another introduction path independent of the flow path for the foregoing at least one fluid is provided, at least one opening leading to this introduction path is arranged in at least any one of the first processing surface and the second processing surface, at least one fluid which is different from the foregoing at least one fluid is introduced into between the processing surfaces through this opening, the fluids to be processed are mixed in the thin film fluid, and a seed microparticle is separated in this thin film fluid, whereby a first step of discharging a discharged fluid which contains the separated microparticle, and a second step of growing the separated seed microparticle in the discharge fluid whereby obtaining an intended microparticle.

Advantages

According to the present invention, provided is a method in which a prescribed microparticle can be obtained by separating a uniform and homogeneous seed microparticle followed by growing the seed microparticle thereby separated; the method like this has been difficult to be realized in the past.

More advantageously, by changing the process conditions, not only a uniform and homogenous microparticle can be produced but also the microparticle whose particle diameter is controlled can be produced continuously and more simply than ever.

In addition, it became possible to control the particle diameter of the obtained microparticle; and as a result, it became possible to selectively produce the microparticles having different particle diameters in accordance with the purposes with a lower cost and a lower energy than ever.

Especially even in the case when the method for producing a microparticle described in Patent Document 3 is used, a uniform and homogeneous microparticle can be produced continuously without reducing the flow amount for processing, in other words, without reducing productivity of the prescribed microparticle per a unit time. With this, there is an advantage that the apparatus for up-scaling can be designed as a comparatively small apparatus.

Furthermore, according to the present invention, a substance which is different from that of the separated seed microparticle can be separated on surface of the said seed microparticle; and thus, the obtained microparticle may be readily bestowed with various functions.

Figure 1:
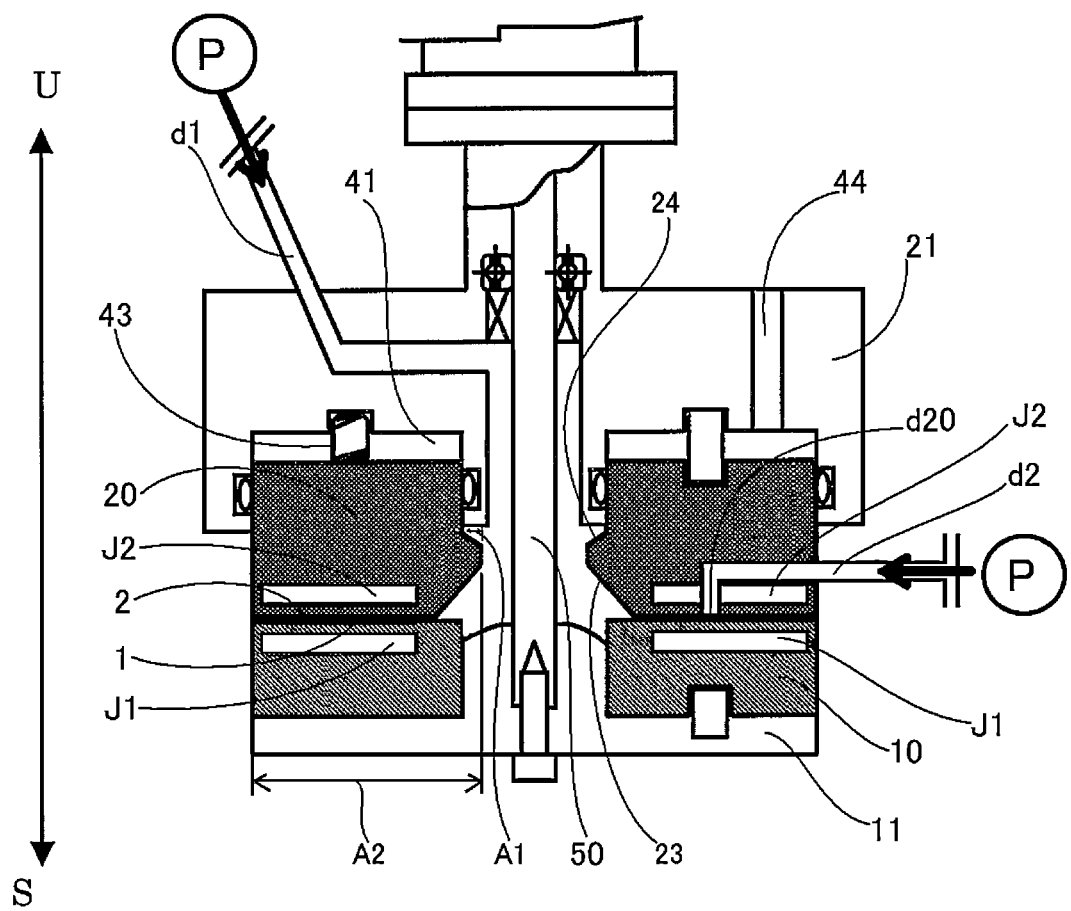
FIG. 1 is a schematic sectional view showing the fluid processing apparatus according to an embodiment of the present invention.

Hereunder, one embodiment of the present invention will be specifically explained.

The raw material fluid in the present invention is the one having a substance to be separated, i.e., a raw material, dissolved with or molecular dispersed into a later-mentioned solvent (hereinafter, this is simply described as dissolution).

The substance to be separated in the present invention is not particularly restricted, while illustrative example thereof includes an organic substance, an inorganic substance, an organic-inorganic composite material, and the like; such as a single body of a metal element and of a non-metal element, a compound of these elements, and the like. Illustrative example of the said compound includes a salt, an oxide, a hydroxide, a hydroxylated oxide, a nitride, a carbide, a complex, an organic compound, a hydrate of these substances, and an organic solvent adduct of these substances. These may be a single substance to be separated or may be a mixture of two or more of them.

Meanwhile, the substance to be separated may be in the same state or in the different state between the substance to be separated that is used as the starting raw material and the substance to be separated that is separated by mixing with the later-mentioned separating fluid. For example, the substance to be separated that is used as the starting raw material may be a metal compound while the substance to be separated that is separated by mixing it with the later-mentioned separating fluid may be a metal single body that constitutes the foregoing metal compound; Or the substance to be separated that is used as the starting raw material may be a metal single body while the substance to be separated that is separated by mixing it with the later-mentioned separating fluid may be the same metal single body. Furthermore, the substance to be separated that is used as the starting raw material may be a mixture of single or plural metal compounds while the substance to be separated that is separated by mixing it with the later-mentioned separating fluid may be an obtained reaction product of the reaction between the mixture of single or plural metal compounds that are substances to be separated used as the starting raw material and the substance contained in the separating fluid to separate the substance to be separated.

The separating fluid in the present invention is to separate the substance to be separated by mixing with the raw material fluid. As to the separating fluid, a later-mentioned solvent may be used solely or by mixing the two or more solvent may contain following substances in the solvent as the substance to separate the substance to be separated. The said substance is not particularly restricted, while illustrative example thereof includes inorganic or organic acidic substances such as hydrochloric acid, sulfuric acid, nitric acid, aqua regia, trichloroacetic acid, trifluoroacetic acid, phosphoric acid, citric acid, and ascorbic acid; basic substances such as alkaline hydroxides including sodium hydroxide and potassium hydroxide, and amines including triethylamine and dimethylamino ethanol; and salts and compounds of these acidic substances and basic substances. In addition, a reducing agent that can reduce the afore-mentioned substances to be separated, for example, a reducing agent capable of reducing a metal and/or a metal compound, preferably a metal ion, contained in the metal solution that is obtained by dissolving a metal and/or a metal compound into a solvent may be mentioned. The reducing agent is not particularly restricted; though a substance capable of reducing a metal ion is preferable. Illustrative example thereof includes hydrazine, hydrazine monohydrate, formaldehyde, sodium sulfoxylate, a boron hydride metal salt, an aluminum hydride metal salt, a triethylboron hydride metal salt, glucose, citric acid, ascorbic acid, tannic acid, dimethylformamide, pyrogallol, tetrabutylammonium borohydride, sodium hypophosphite ($NaH_2PO_2 \cdot H_2O$), Rongalite C ($NaHSO_2 \cdot CH_2O \cdot 2H_2O$), and a metal compound or an ion thereof, preferably a transition metal or an ion thereof, such as iron and titanium. The foregoing reducing agents include those in the form of a hydrate, an organic solvent adduct, and an anhydrous compound thereof. These substances to separate a substance to be separated each may be used singly or as a mixture of two or more of them.

Solvents:

The solvent to be used for a raw material fluid and separating fluid in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. If the foregoing alcoholic organic solvents or polyol organic solvents are used as the solvent, there is a merit that these solvents can act also as the reducing agent; particularly it is effective in the case of producing a metal microparticle. These solvents each may be used singly or as a mixture of two or more of them. Especially, as to the separating fluid, the above-mentioned solvent may be used solely as the separating fluid, as mentioned above.

The raw material fluid and/or the separating fluid in the present invention may be used even if these include the state of solid and crystal such as a dispersion solution and a slurry of them.

Hereunder, specific embodiments of the present invention will be explained by taking a method for producing a metal microparticle as the example thereof. However, the present invention is not limited to the method for producing a metal microparticle.

Metal Fluids and Metals:

The metal fluid in the present invention is the fluid in which any one of a metal and a metal compound or both are dissolved in a solvent thereby being a raw material fluid.

Metals in the present invention are not particularly restricted. Preferably, all metal elements in the periodical table may be used. Illustrative example of the metal element includes Ti, Fe, W, Pt, Au, Cu, Ag, Pb, Ni, Mn, Co, Ru, V, Zn, Zr, Sn, Ta, Nb, Hf, Cr, Mo, Re, In, Ir, Os, Y, Tc, Pd, Rh, Sc, Ga, Al, Bi, Na, Mg, Ca, Ba, La, Ce, Nd, Ho, and Eu. In addition to these metal elements, non-metal elements as the metal elements of B, Si, Ge, As, Sb, C, N, O, S, Te, Se, F, Cl, Br, I, and At may be used in the present invention. These metals may be constituted of a single element; or an alloy formed of a plurality of metal elements or a substance which contains a metal element and a non-metal element may be used. Naturally, an alloy formed of a precious metal and a non-precious metal may be used.

Metal Compounds:

A metal solution in which a metal compound of these metals, in addition to a single element of the foregoing metals (including non-metal elements mentioned above), is dissolved in the solvent may be used as the metal fluid. The metal compound of the present invention is not particularly restricted; and illustrative example thereof includes metal compounds in the form of a metal salt, an oxide, a hydroxide, a hydroxylated oxide, a nitride, a carbide, a complex, an organic salt, an organic complex, an organic compound, and a hydrate and an organic solvent adduct of them. The metal salt is not particularly restricted; and illustrative example thereof includes a nitrate, a nitrite, a sulfate, a sulfite, a formate, an acetate, a phosphate, a phosphite, a hypophosphite, a chloride, an oxysalt, an acetylacetonato salt, and a hydrate or an organic solvent adduct of these metal salts. Illustrative example of the organic compound includes a metal alkoxide. These metal compounds may be used singly or as a mixture of two or more of them.

Reducing Agent and Reducing Agent Fluid:

The reducing agent fluid of the present invention shall contain at least one reducing agent shown above. It is preferable to use, as the reducing agent fluid, a reducing agent solution which is obtained by mixing the foregoing reducing agent with a solvent or by dissolving the same in a solvent. In this case, the reducing agent fluid is the separating fluid.

The metal fluid and/or the reducing fluid in the present invention may be used even if these include the state of solid and crystal such as a dispersion solution and a slurry of them.

Fluid Processing Apparatus:

The present invention is preferably executed by a method in which uniform mixing and stirring of a raw material fluid with a separating fluid, or mixing and stirring of a metal fluid with a reducing agent fluid, are done in a thin film fluid formed between processing surfaces which are disposed in a position they are faced with each other so as to be able to approach to and separate from each other, at least one of which rotates relative to the other; and thus, for example, it is preferable to use an apparatus based on the same principle as the apparatus shown in Patent Document 3 filed by the present applicant, wherein a seed microparticle of a substance to be separated is separated by mixing in the way as mentioned above, and then a fluid which contains the separated seed microparticle is discharged as a discharge solution. Further, in the present invention, it is preferable, for example, to use an apparatus based on the same principle as the apparatus shown in Patent Document 3 filed by the present applicant, wherein a seed microparticle is separated in a thin film fluid formed between processing surfaces which are disposed in a position they are faced with each other so as to be able to approach to and separate from each other, at least one of which rotates relative to the other, whereby a fluid which contains the separated seed microparticle is discharged as a discharge fluid. By using the apparatus based on the principle mentioned above, a uniform and homogeneous microparticle can be obtained.

Hereinafter, embodiments of the above-mentioned fluid processing apparatus will be explained by using the drawings.

Figure 2:
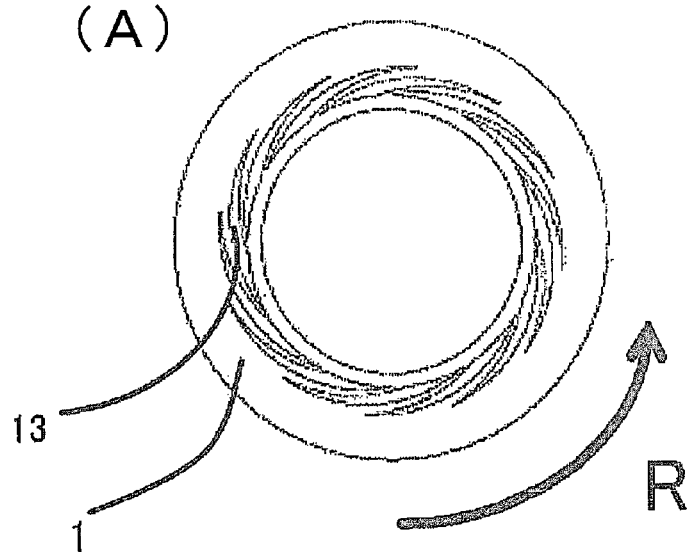
FIG. 2(A) is a schematic plane view of the first processing surface in the fluid processing apparatus shown in FIG. 1.
FIG. 2(B) is an enlarged view showing an important part of the processing surface in the apparatus.
Figure 2:
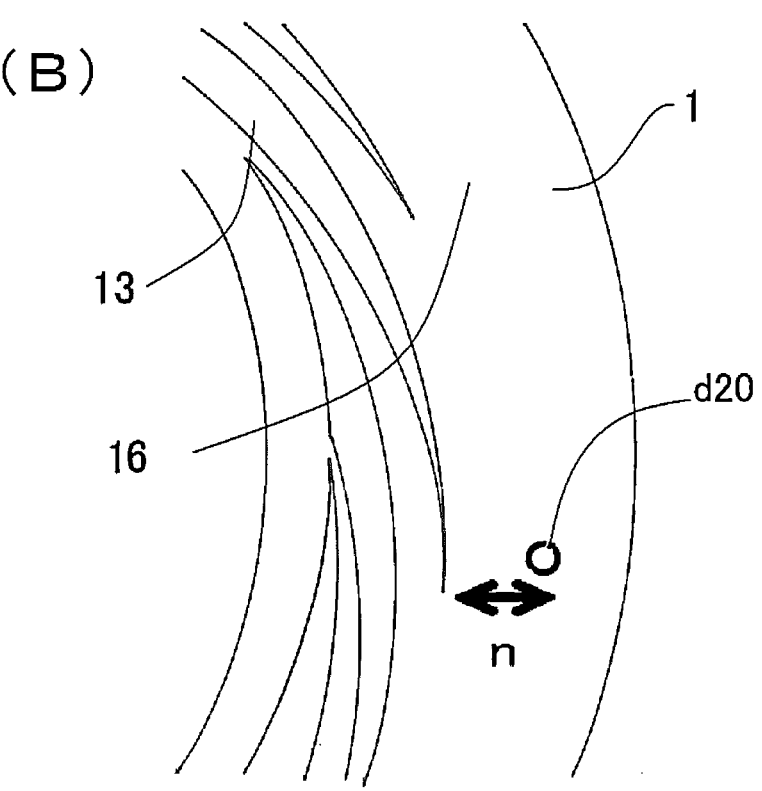
Figure 3:
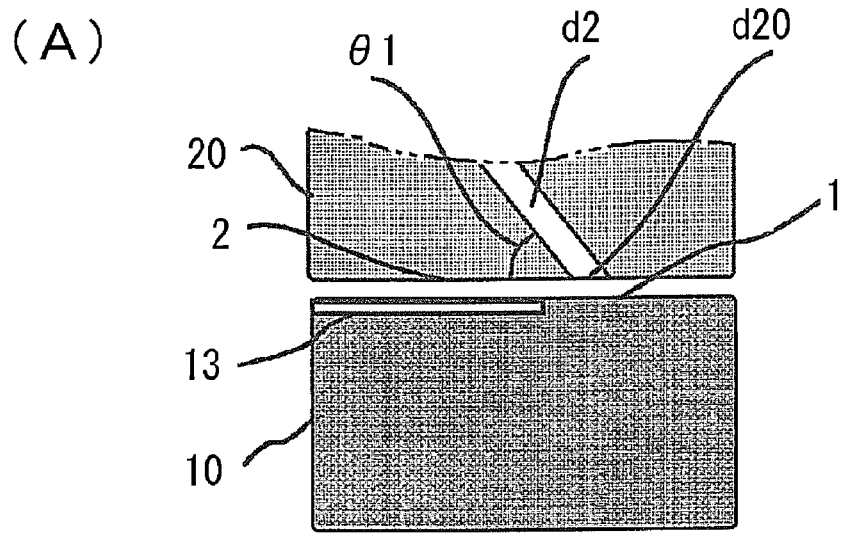
FIG. 3(A) is a sectional view of the second introduction member of the apparatus.
FIG. 3(B) is an enlarged view showing an important part of the processing surface for explaining the second introduction member.
Figure 3:
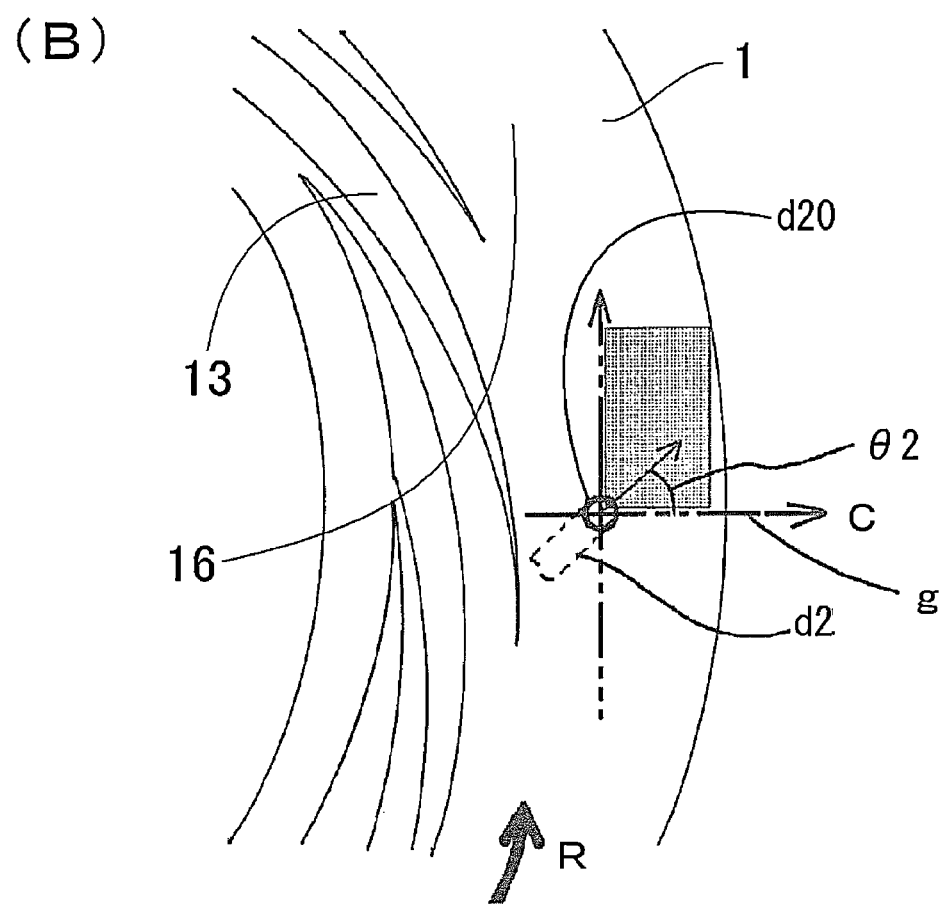

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 m to 50 m. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature controlling mechanism J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changedx to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Form of the opening d20 may be a circular form as shown in FIG. 2(B) and FIG. 3(B); or a concentric circular ring surrounding the central opening of the processing surface 2 which is a ring-shape disk (this is not shown by drawing). Further, if the opening is in the form of a circular ring, this circular ring opening may be continuous or discontinuous.

This second introduction part d2 may have directionality. For example, as shown in FIG. 3(A), the direction of introduction from the opening d20 of the second processing surface 2 is inclined at a predetermined elevation angle ($\theta$1) relative to the second processing surface 2. The elevation angle ($\theta$1) is set at more than 0° and less than 90°, and when the reaction speed is high, the angle ($\theta$1) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta$2) exists facing the rotation direction R from a reference line g, which is the line to the outward direction and in the radial direction passing through the opening d20. This angle ($\theta$2) is also set preferably at more than 0° and less than 90°.

This angle ($\theta$2) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the separation of seed microparticles by using the above-mentioned apparatus will be explained.

In the apparatus, the raw material fluid in which at least one substance to be separated is dissolved in a solvent and the separating fluid are mixed in the thin fluid formed between the processing surfaces which are disposed in a position they are faced with each other so as to be able to approach to and separate from each other, at least one of which rotates relative to the other, thereby separating seed microparticles.

Figure 4:
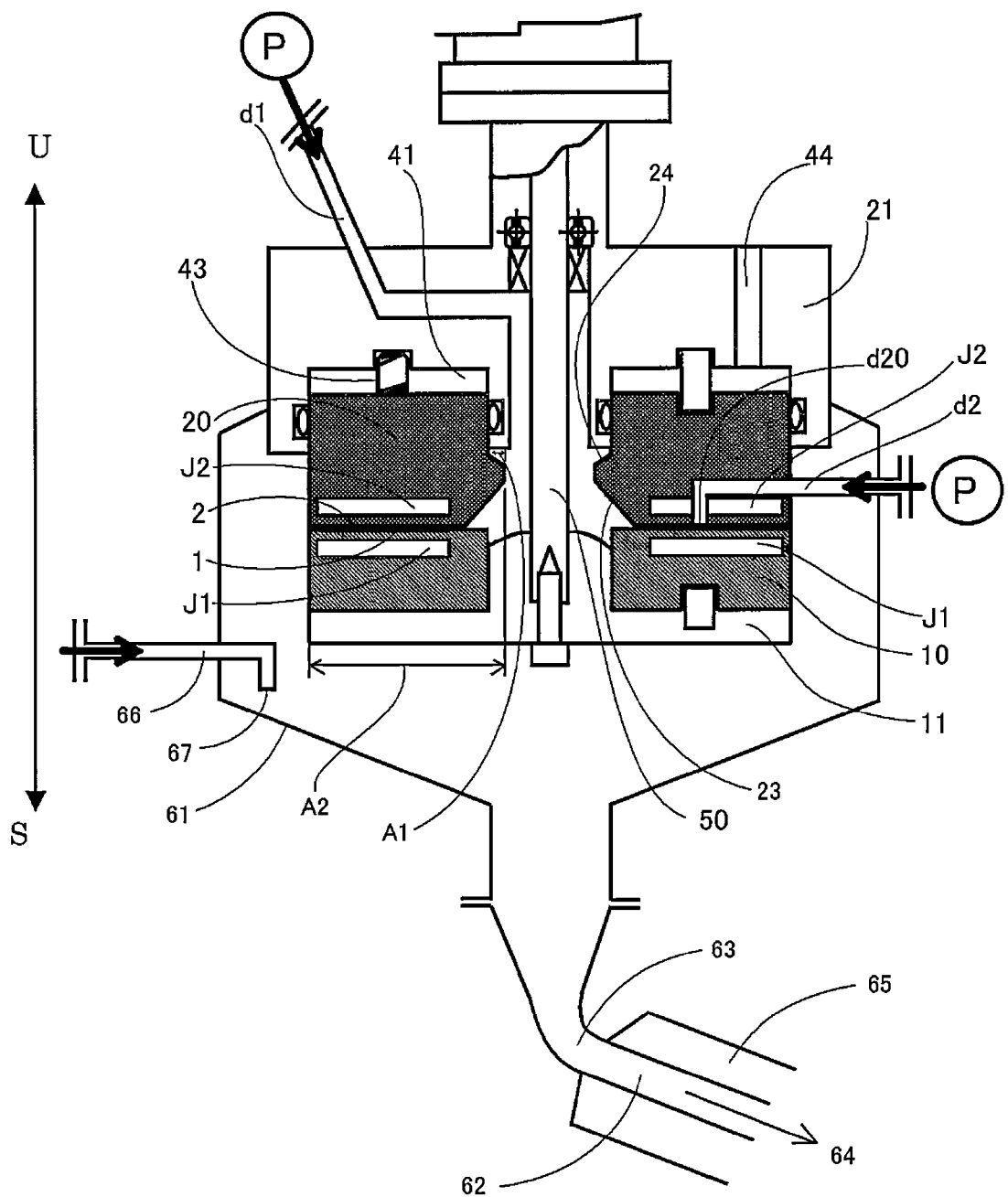
FIG. 4 is a schematic sectional view showing the fluid processing apparatus according to other embodiment of the present invention.

The separation of the seed microparticles takes place in the apparatus as shown in FIG. 1 and FIG. 4 of the present application while the fluids are being mixed forcibly and uniformly between the processing surfaces 1 and 2 which are disposed in a position they are faced with each other so as to be able to approach to and separate from each other, at least one of which rotates relative to the other.

At first, the separating fluid is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the raw material fluid in which at least any one of the substance to be separated is dissolved in a solvent is introduced as the second fluid directly into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby effecting the uniform nucleation.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

As mentioned before, the processing apparatus may be provided with, in addition to the first introduction part d1 and the second introduction part d2, the third introduction part d3; and in this case, for example, each of the fluids may be introduced into the processing apparatus as the first fluid, the second fluid, and the third fluid. By so doing, concentration and pressure of each fluid can be controlled separately so that the separation reaction and the microparticle diameter may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided.

In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Dispersing Agent and so Forth:

In the present invention, various dispersing agents and surfactants may be used in accordance with the purpose and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various polymers. These may be used singly or as a combination of two or more of them.

The surfactants and dispersing agents may be contained in the metal solution, in the reducing fluid, or in the both fluids. Alternatively, the surfactants and the dispersing agents may be contained in a third fluid that is different from the raw material fluid and the separating fluid.

Nuclear Formation and Nuclear Growth Between Processing Surfaces:

Generally, production of a microparticle comprises a step of forming a nucleus of a microparticle and a step of growing this nucleus to a particle. In the step of forming a nucleus of a microparticle, a molecule, an ion, a cluster, and the like that are derived from a substance to be separated which is dissolved in a raw material fluid is mixed with a separating fluid, thereby separating, a nucleus by change of solubility or a reaction with the separating fluid. Thereafter, the substance to be separated which is still present as a molecule, an ion, a cluster, and the like in the mixed solution containing the formed nucleus and comprising the raw material fluid and the separating fluid is separated on the previously separated nucleus as the starting point to grow the particle. In the past, diffusion of the molecule, the ion, the cluster, and the like could be facilitated by mixing the raw material fluid and the separating fluid in the thin film fluid formed between extremely minute space of the at least two processing surfaces 1 and 2 which are disposed in a position they are faced with each other so as to be able to approach to and separate from each other, at least one of which rotates relative to the other; and thus, the uniform and homogeneous nuclear formation and nuclear growth became possible so that production of the uniform and homogeneous microparticle became possible. In the present invention, however, it was found that even if a step of producing a prescribed microparticle by growing a seed microparticle contained in the discharge fluid that is discharged from between the processing surfaces 1 and 2 is carried out in the discharge fluid that is discharged from between the processing surfaces 1 and 2, similarly to the above-mentioned case that growth of the nucleus is completed between the processing surfaces 1 and 2, the uniform and homogeneous microparticle can be obtained. With this, it became possible to further shorten the residence time of the fluid—which contains the seed microparticle separated in the thin film fluid formed between the processing surfaces 1 and 2—in between the processing surfaces 1 and 2 than before. In other words, the flow amount for processing in a certain time could be increased much more than before. Accordingly, the present invention may be executed in such a way that a uniform and homogeneous seed microparticle is separated between the processing surface 1 and 2 which are disposed so as to be able to approach to and separate from each other, and after the fluid which contains this seed microparticle is discharged from between the processing surfaces 1 and 2 as the discharge fluid, the seed microparticle is grown in the discharge fluid until the prescribed microparticle.

In the present invention, as mentioned above, the seed microparticle includes various microparticles which are separated in the thin film fluid, such as the microparticle nucleus which is generated in the thin film fluid formed between the two processing surfaces and the generated microparticle which has grown up to a certain size or is still growing in the thin film fluid formed between the processing surfaces 1 and 2.

In the present invention, the growth means, as mentioned above, that a molecule, an ion, a cluster, and the like that are derived from the substance to be separated which are presented in the mixed solution of the raw material fluid with the separating fluid are separated on the previously separated seed microparticle nucleus as the starting point to grow the particle; and thus, it does not include the microparticle which is grown up merely in size by agglomeration of the microparticles among themselves.

Growth as the Particle after Discharged from Between the Processing Surface:

The present invention may be executed in such a way that the seed microparticle is grown until a prescribed microparticle in the discharge fluid that is discharged from between the processing surfaces 1 and 2.

One example of the way how to execute the step of growing in the present invention may be as following: the discharge fluid that is discharged from between the processing surfaces 1 and 2 of the before-mentioned apparatus is recovered in a vacant vessel such as a beaker and a tank, whereby carrying out the growth and completing the growth. During this time, the discharge fluid that is recovered into the vessel may be stirred if necessary; and in this case the equipment and the way how to stir are not particularly restricted.

After the discharge fluid is recovered, from the start of introduction thereof into the vessel till completion of the growth, the discharge fluid is in the mixed state successively, which influences the progress of the growth in the vessel, such as the one for storage, in which the discharge fluid resides, so that this may cause inhomogeneous growth and formation of a new nucleus. Because of this, in the present invention, it is preferable to introduce the discharge fluid that is discharged from between the processing surfaces 1 and 2 into a tubular vessel or the like having an introduction port in one end and a discharge port in other end, whereby completing the growing process in this tubular vessel. Specifically, as shown in FIG. 4, the vessel 61 is arranged to collect the discharge fluid that is discharged from between the processing surfaces 1 and 2, and the tubular vessel 62 is connected to the lower end of the vessel 61. This connecting site is the introduction port 63 of the tubular vessel. The discharge fluid is introduced through the introduction port 63 of the tubular vessel into the tubular vessel 62 that is connected to the vessel 61, and the seed microparticle contained in the discharge fluid is grown in the tubular vessel 62, whereby executing the invention. In the method as mentioned above, the step of separating the seed microparticle in the thin film fluid formed between the processing surface 1 and 2 whereby discharging the fluid which contains the seed microparticle as the discharge fluid and the step of introducing the discharge fluid into the tubular vessel 62 through the introduction port 63 of the tubular vessel whereby growing the seed microparticle, contained in the discharge fluid, in the tubular vessel to obtain the prescribed microparticle may be carried out continuously. Moreover, as mentioned later, a mixer may be installed inside the tubular vessel 62, and further, the tubular vessel 62 may be provided with the temperature controlling mechanism 65. Furthermore, the supplying equipment 66 to supply a third fluid which is different from the raw material fluid and the separating fluid may be installed with arranging the opening part 67 thereof in the vessel 61, whereby the third fluid, together with the discharge fluid, may be introduced into the tubular vessel 62 for mixing.

Furthermore, a fluid which can control the progress of the growth, after recovery of the discharge fluid, from the start of introduction thereof into the vessel till completion of the growth may be mixed with the discharge fluid so that the growth of the seed microparticle may be controlled. By so doing, a uniform and homogeneous seed microparticle that is separated between the processing surfaces 1 and 2 may be grown to the prescribed microparticle in the uniform and homogeneous state.

The present invention may be executed in such a way that after the seed microparticle separated between the processing surfaces 1 and 2 is discharged from between the processing surfaces 1 and 2, the said seed microparticle is grown significantly larger than its original particle diameter.

Meanwhile, it is not necessary to grow the microparticle until completion of the growth; and thus, the growth may be terminated at the stage where the microparticle is grown to the prescribed particle diameter. The method how to terminate the growth is not particularly restricted.

The means to confirm the growth of the microparticle and the completion of the growth thereof is not particularly restricted. For example, by change of the color of the discharge fluid, completion of the growth may be confirmed. The discharge fluid immediately after it is discharged from between the processing surfaces 1 and 2 of the apparatus explained above contains, in addition to the separated seed microparticle, an ion, a molecule, a cluster, and the like that are derived from a substance to be separated; and thereafter, these species including the ion in the discharge fluid are consumed by separation thereof as the growth of the seed microparticle progresses so that these species including the ion may not exist anymore. That is, color of the discharge fluid changes in accordance with the amount of the ion, the molecule, the cluster, and the like that are derived from the substance to be separated contained in the discharge fluid, so that completion of the growth of the microparticle may be confirmed.

The prescribed microparticle produced in the present invention is preferably a crystalline microparticle; and the seed microparticle separated in the thin film fluid formed between the processing surfaces 1 and 2 is preferably a crystalline microparticle or a crystalline nucleus. However, the present invention is not limited to the crystalline microparticle and the crystalline nucleus. The present invention may also be executed in such a way that an amorphous nucleus is grown to form a crystalline microparticle, a crystalline nucleus is grown to finally form an amorphous microparticle, or an amorphous nucleus is grown to an amorphous microparticle. Alternatively, onto surface of the seed microparticle separated between the processing surfaces 1 and 2 or of the prescribed microparticle that is obtained by growing the seed microparticle, other material or a different material such as an element may be separated whereby coating these surfaces. In the present invention, to separate other material onto surface of the seed microparticle is not only to form the coat layer directly onto the surface of the seed microparticle but also to form the coat layer indirectly onto the surface of the seed microparticle.

Tubular Vessel:

In the present invention, the tubular vessel in which the seed microparticle is grown is not particularly restricted provided that the tubular vessel has an introduction port in one end and a discharge port in other end. The tubular vessel is preferably made of a material that is inert to the discharge fluid that is discharged from between the processing surfaces 1 and 2 as well as to the seed microparticle and other substances contained in the discharge fluid in the growing process in producing of the microparticle. Further, the diameter of the tubular vessel is not particularly restricted. The diameter thereof is preferably such that the discharge fluid that is discharged from between the processing surfaces 1 and 2 may be introduced into the tubular vessel 62 thorough the introduction port 63 and then discharged from the discharge port 64 without problems. The length of the tubular vessel is not particularly restricted either. The length thereof is preferably such that the discharge fluid that is discharged from between the processing surfaces 1 and 2 may complete the growing process before this fluid is discharged from the tubular vessel since it is introduced into the tubular vessel 62. The discharge fluid is introduced promptly into the tubular vessel 62 after it is discharged from between the processing surfaces 1 and 2.

Further, the tubular vessel 62 may be provided with a mixer therein. For example, a structure in which a mixer such as a static mixer is arranged in the tubular vessel 62 may be used. Moreover, a mechanism to control the temperature of the discharge fluid inside the tubular vessel 62 may be installed to carry out the invention. With this, there is an advantage that progress of the growth of the microparticle may be controlled readily. The mechanism and the way to control the temperature are not particularly restricted; and thus, by making it a jacket structure or a double pipe structure, a heating medium or a cooling medium for controlling the temperature may be used; or alternatively a structure of a coil-type heat exchanger, such as for example, the M-coil type (trade name, manufactured by M-Technique Co., Ltd.) may be used. Besides, a method using the Peltier device and a method using a direct heating and cooling system may be used. The mechanism to introduce the discharge fluid that is discharged from between the processing surfaces 1 and 2 into the tubular vessel 62 is not particularly restricted; and thus, a method in which the discharge fluid is introduced by a pump or a compressed gas pressure may be used, or it may be introduced by making the tubular vessel 62 to a configuration such as the rotary positive displacement pump. Besides, a method in which by utilizing the gravity, the discharge fluid that is discharged from between the processing surfaces 1 and 2 is passed from the top to the bottom of the tubular vessel may be used.

The present invention is not limited to the method in which the seed microparticle is separated by mixing two or more fluids in the thin film formed between the at least two processing surfaces which are disposed in a position they are faced with each other so as to be able to approach to and separate from each other, at least one of which rotates relative to the other. For example, an embodiment may be executed as following; a raw material fluid in which at least one substance to be separated is dissolved is introduced into between the processing surfaces 1 and 2, wherein the solubility thereof is changed by changing the temperature, or the substance to be separated which is dissolved in the raw material fluid is reacted, whereby separating the seed microparticle, and then this seed microparticle is grown in the discharge fluid that is discharged from between the processing surfaces 1 and 2.

EXAMPLES

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1 and FIG. 4; the first fluid means the first fluid to be processed that is introduced through the first introduction part d1 of the processing apparatus as described before; and the second fluid means the second fluid to be processed that is introduced through the second introduction part d2 of the fluid processing apparatus shown in FIG. 1 and FIG. 4, as described before.

Measurement of pH:

Measurement of pH was made by using a pH meter (Type D-51, manufactured by Horiba Ltd.). Before introducing each of the fluids to be processed into the fluid processing apparatus, pH of each of the fluids to be processed was measured at room temperature.

Observation with Scanning Electron Microscope:

For the observation with a scanning electron microscope (SEM), the field emission scanning electron microscope (FE-SEM) JSM-7500F (manufactured by JEOL Ltd.) was used. Observation condition with the magnification of 10,000 or more was used; and the particle diameter of the microparticle was the average value of 10 observation spots.

Observation with Transmission Electron Microscope:

For the observation with a transmission electron microscope (TEM), JEM-2100 (manufactured by JEOL Ltd.) was used. Observation condition with the magnification of 30,000 or more was used; and the particle diameter of the microparticle was the average value of 10 observation spots.

X-Ray Diffraction Measurement:

For the X-ray diffraction measurement (XRD), the powder X-ray diffraction measurement instrument X'Pert Pro MPD (XRD, manufactured by Spectris Co., Ltd., PANalytical B. V.) was used. Measurement conditions with the Cu anticathode, the tube voltage of 45 kV, the tube current of 40 mA, and the scanning rate of 1.6°/minute were used.

In these Examples, the fluid processing apparatus based on the same principle as the apparatus shown in Patent Document 3, as shown in FIG. 1 or FIG. 4, was used. The raw material fluid and the separating fluid were mixed in the thin film fluid formed between the processing surfaces 1 and 2 to separate the seed microparticle in the thin film fluid; and thereafter, the said seed microparticle was grown to obtain the prescribed microparticle.

Examples: Nickel

While a nickel solution (0.1 M nickel nitrate hexahydrate ($Ni(NO_3)_2 \cdot 6H_2O$/0.2 M of triethanolamine (TEA)/0.1% by weight of ammonium polyacrylate (PAA) in ethylene glycol (EG)) was introduced as the first fluid (metal fluid) from the center with the supply pressure of 0.18 MPaG, the rotation number of 1000 rpm, the supply temperature of 100° C., and the supply rate of 1000 mL/minute, a reducing agent solution (20% by weight of potassium hydroxide (KOH)/10% by weight of pure water ($H_2O$) in hydrazine monohydrate (HMH)) was introduced as the second fluid with the supply temperature of 54° C. and the supply rate of 50 mL/minute, the both fluids being introduced into between the processing surfaces 1 and 2, whereby the first fluid and the second fluid were mixed in the thin film fluid. Each of the supply temperatures of the first fluid and the second fluid was measured just before introduction of each of the first fluid and the second fluid into the processing apparatus (in more detail, just before introduction into between the processing surfaces 1 and 2). Measurement of pH of the first fluid by a pH meter showed 6.93, and pH of the second fluid by a pH test paper was 14 or higher. The discharge fluid immediately after it was discharged from between the processing surfaces 1 and 2 showed the temperature of 95° C. with a color of murky yellowish green.

Example 1: Nickel

Figure 5:
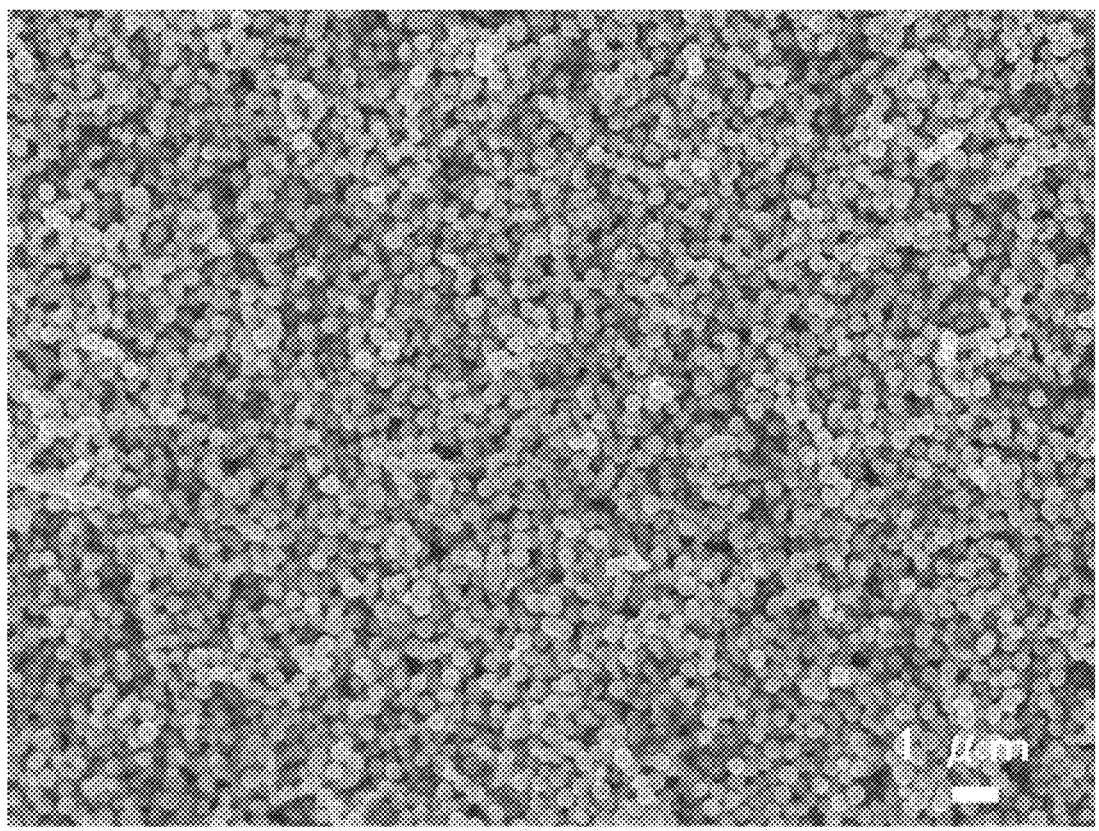
FIG. 5 is a SEM picture of nickel microparticles produced in Example 1 of the present invention.

In Example 1, the discharge fluid which contained the seed microparticles of the nickel microparticles discharged from between the processing surfaces 1 and 2 under the conditions mentioned above was recovered in one vessel for the period of 20 seconds. During the recovery operation, the process was confirmed that the discharge fluid changed its state from a murky yellowish green to black. The recovery operation was done for the period of 20 seconds, and after about 20 seconds from completion of the recovery operation, change of the color in the discharge fluid was not observed visually. The temperature of the discharge fluid at this time was 95° C. To recover the nickel microparticles, the discharge solution was allowed to stand until the temperature thereof reached room temperature. Thereafter, the nickel microparticles were settled, the supernatant thereof was removed, washing by pure water was done for three times, and then the remaining solid was dried under an atmospheric pressure at 25° C. As a result of the XRD measurement of the nickel microparticle powders after drying, it was confirmed that homogeneous nickel that was free from impurities could be obtained. In FIG. 5, the SEM picture of the nickel microparticles obtained in Example 1 is shown. From FIG. 5, it was confirmed that the nickel microparticles having the size of about 200 nm could be produced homogeneously. The production amount of the nickel microparticles was 5.9 g/minute.

Comparative Example 1: Nickel

In Comparative Example 1, conditions of generation of the nickel microparticle nuclei and of growth thereof to the nickel microparticles in between the processing surfaces 1 and 2 were studied. As a result, when the nickel solution, the first fluid, was supplied at the temperature of 120° C. and the rate of 100 mL/minute, and the reducing agent solution, the second fluid, was supplied at the temperature of 54° C. and the rate of 50 mL/minute were introduced into between the processing surfaces 1 and 2, the discharge fluid having the same color as the black color of Example 1 could be discharged from between the processing surfaces 1 and 2. The supply pressure and the rotation number were made as same as those of Example 1. The temperature of the discharge fluid immediately after it was discharged from between the processing surfaces 1 and 2 was 95° C. The nickel microparticles were recovered from the discharge fluid discharged from between the processing surfaces 1 and 2 by the same procedure as that of Example 1. The XRD measurement and the SEM observation gave the almost same results as Example 1. It was confirmed that the particle diameter thereof was about 200 nm and that the uniform and homogeneous nickel microparticles free from impurities could be produced. However, the production amount of the nickel microparticles was 0.59 g/minute, which was about ¹⁄₁₀ as compared with Example 1.

Example 2: Nickel

Figure 6:
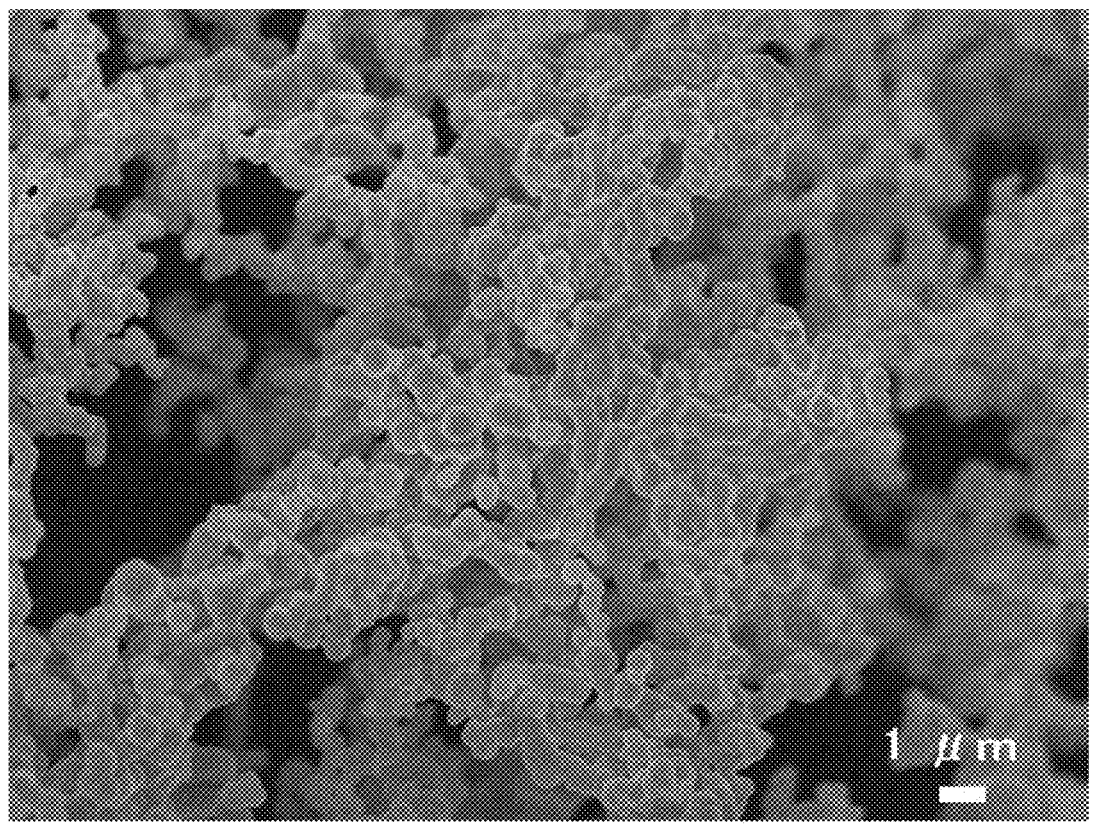
FIG. 6 is a SEM picture of nickel microparticles produced in Example 2 of the present invention.

In Example 2, the discharge fluid discharged from between the processing surfaces 1 and 2 was recovered in one vessel for the period of 20 minutes in a similar manner to Example 1. During the recovery operation, the process was confirmed that the discharge fluid changed its state from murky yellowish green to black; and after about 40 seconds from the start of the recovery operation, change of the color in the discharge fluid was not observed visually. The temperature of the discharge fluid at this time was 95° C. The nickel microparticles were recovered by the same procedure as Example 1, and the XRD measurement and the SEM observation thereof were carried out. As a result of the XRD measurement, it was confirmed that homogeneous nickel that was free from impurities could be obtained. In FIG. 6, the SEM picture of the nickel microparticles obtained in Example 2 is shown. From FIG. 5 and FIG. 6, it was confirmed that inhomogeneous microparticles having less homogeneity in particle diameter as compared with Example 1 were produced.

Comparative Example 2: Nickel

Figure 7:
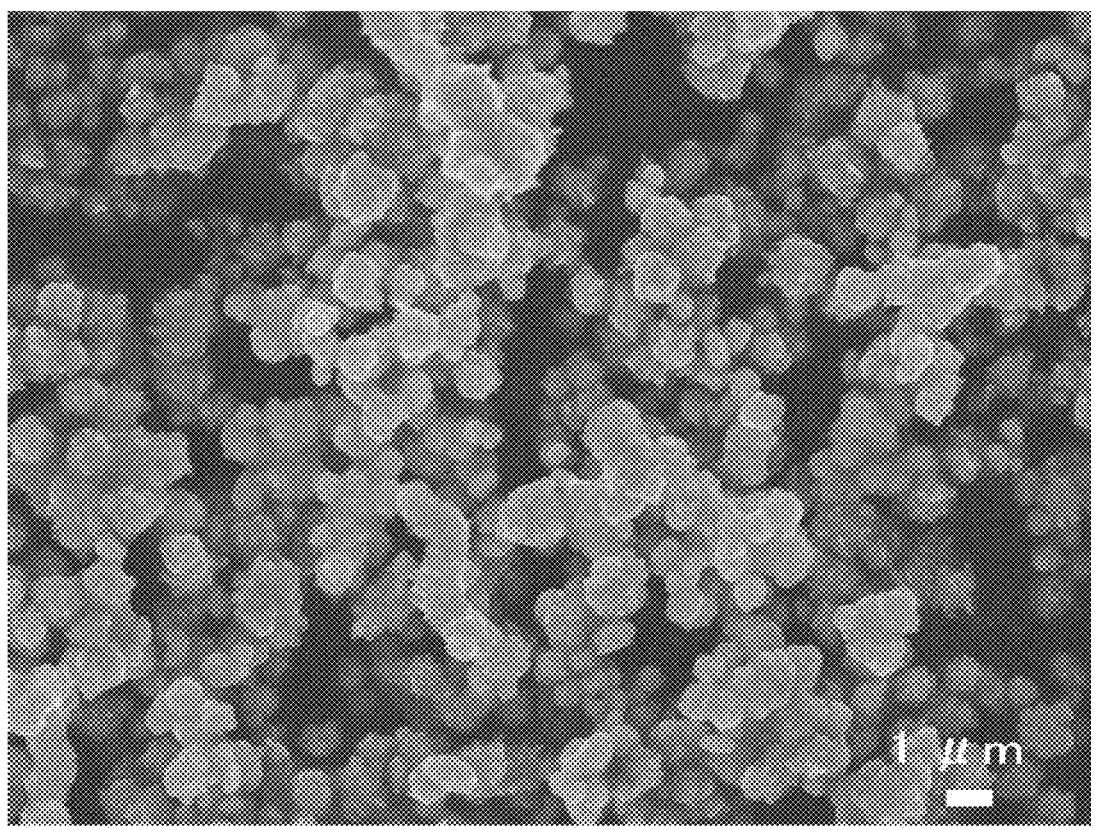
FIG. 7 is a SEM picture of nickel microparticles produced in comparative Example 2 of the present invention.

In Comparative Example 2, 50 mL of the same reducing agent solution as Example 1 with the temperature of 54° C. was charged into a beaker containing 1000 mL of the same nickel solution as Example 1 with the temperature of 100° C. for the period of 1 minute with stirring. The color of the mixed solution immediately after all of 50 mL of the reducing agent solution was charged into the beaker was yellowish green, which was then changed to black. One minute after all of 50 mL of the reducing agent solution was charged into the beaker, there was no color change visually in the mixed solution; and the temperature of the mixed solution at this time was 95° C. The nickel microparticles were recovered by the same procedure as Example 1; and the XRD measurement and the SEM observation thereof were carried out. As a result of the XRD measurement, it was confirmed that homogeneous nickel that was free from impurities could be obtained. In FIG. 7, the SEM picture of the nickel microparticles obtained in Comparative Example 2 is shown. From FIG. 5 to FIG. 7, it was confirmed that inhomogeneous microparticles having further less homogeneity in particle diameter as compared with Example 1 and Example 2 were produced.

Example 3: Nickel

In Example 3, as shown in FIG. 4 of the fluid processing apparatus, the vessel 61 to collect the discharge fluid was installed so as to be connected to the tubular vessel 62. The diameter and length of the tubular vessel each was set so as to give 20 seconds or longer as the residence time of the discharge fluid in the tubular vessel 62. Further, the tubular vessel 62 was put in the oil bath 65. The nickel solution and the reducing agent solution were mixed in the thin film fluid formed between the processing surfaces 1 and 2 under the same conditions as Example 1 whereby discharging the fluid which contained the seed microparticles of the nickel microparticles from between the processing surfaces 1 and 2 as the discharge fluid, whereby the discharge fluid was introduced continuously into the tubular vessel 62 through the introduction port 63 of the tubular vessel, and then discharged through the discharge port 64 of the tubular vessel. The discharge fluid was continuously discharged without stagnation in the vessel 61. The temperature of the oil bath 65 was set so as to give 95° C. as the temperature of the discharge fluid that was discharged from the discharge port 64 of the tubular vessel. The discharge fluid that was introduced to the introduction port 63 of the tubular vessel was in the state of murky yellowish green, while the discharge fluid that was discharged from the discharge port 64 of the tubular vessel was black in its color. The nickel microparticles were recovered by the same procedure as that of Example 1; and the XRD measurement and the SEM observation thereof were carried out. Both results of the XRD measurement and the SEM observation showed the same results as those of Example 1; and it was confirmed that the particle diameter thereof was about 200 nm and that the uniform and homogeneous nickel microparticles free from impurities could be produced. The production amount of the nickel microparticles was 5.9 g/minute.

From the above results, it was found that when the nickel microparticles are produced, if the method thereof includes two steps, that is, a step of separating seed microparticles of the nickel microparticles in the thin film fluid formed between the processing surfaces 1 and 2 in the fluid processing apparatus, and after the fluid which contains the separated seed microparticles is discharged from between the processing surfaces 1 and 2 as the discharge fluid, a step of growing the separated seed microparticles in the discharge fluid to a prescribed particle diameter, then the production amount of the nickel microparticles per unit time can be increased. Furthermore, it was found that when the fluid which contains the nickel microparticles discharged from between the processing surfaces 1 and 2 is continuously introduced into the tubular vessel 62, the uniform and homogeneous nickel microparticles that are grown to the prescribed particle diameter can be produced continuously.

Meanwhile, the effects including the shortened time necessary to grow the seed microparticles were observed when a mixer was installed inside the tubular vessel 62 so as to stir the discharge fluid that was introduced into the tubular vessel 62.

Examples: Silver

While a reducing agent fluid (2% by weight of aqueous ascorbic acid (pH=2.50)) was introduced as the first fluid from the center with the supply pressure of 0.090 MPaG, the rotation number of 1700 rpm, the supply temperature of 20.8° C., and the supply rate of 400 mL/minute, a metal fluid (5.67% by weight of aqueous silver nitrate (pH=5.30)) was introduced as the second fluid with the supply temperature of 22.5° C. and the introduction rate of 10 mL/minute, the both fluids being introduced into between the processing surfaces 1 and 2, whereby the first fluid and the second fluid were mixed in the thin film fluid. Each of the supply temperatures of the first fluid and the second fluid was measured just before introduction of each of the first fluid and the second fluid into the processing apparatus (in more detail, just before introduction into between the processing surfaces 1 and 2). The discharge fluid immediately after it was discharged from between the processing surfaces 1 and 2 showed the temperature of 21.0° C. with an appearance of slightly murky gray in its color.

Example 4: Silver

In Example 4, the discharge fluid which contained the seed microparticles of the silver microparticles discharged from between the processing surfaces 1 and 2 under the conditions mentioned above was recovered in one vessel for the period of 60 seconds. During the recovery operation, the process was confirmed that the discharge fluid changed its state from a slightly murky gray to dark gray, and that the appearance thereof changed toward more murky as the time passed than that immediately after the discharge; and after about 20 seconds from completion of the recovery operation which took 60 seconds, change of the color in the discharge fluid was not observed visually. The temperature of the discharge fluid at this time was 21.0° C. Thereafter, the discharge fluid was allowed to stand at room temperature to settle the silver microparticles; then after the supernatant thereof was removed, washing by pure water was done for three times, and the remaining solid was dried under an atmospheric pressure at 25° C. As a result of the XRD measurement of the silver microparticle powders after drying, it was confirmed that homogeneous silver that was free from impurities could be obtained. As a result of the SEM observation, it was confirmed that the silver microparticles having the size of about 1 µm could be produced homogeneously. The production amount of the silver microparticles was 0.4 g/minute.

Comparative Example 3: Silver

In Comparative Example 3, the discharge fluid which contained the seed microparticles of the silver microparticles discharged from between the processing surfaces 1 and 2 was recovered under the same conditions as those of Example 4; and then, without waiting for the color change of the discharge fluid, the seed microparticles of the silver microparticles contained in the discharge fluid immediately after it was discharged from between the processing surfaces 1 and 2 were recovered by using a membrane filter (pore diameter of 0.1 µm). It was confirmed by the TEM observation that the homogeneous seed microparticles having the size of about 100 nm were separated.

Comparative Example 4: Silver

In Comparative Example 4, conditions of generating the silver microparticle nuclei and of growing thereof to the silver microparticles between the processing surfaces 1 and 2 were studied. As a result, when the reducing agent fluid, the first fluid, was supplied at the temperature of 20.8° C. and the rate of 50 mL/minute and the raw material fluid, the second fluid, was supplied at the temperature of 22.5° C. and the rate of 1.0 mL/minute, the both fluids were introduced into between the processing surfaces 1 and 2, the discharge fluid having the same color as the dark gray color of Example 4 could be discharged from between the processing surfaces 1 and 2. The supply pressure and the rotation number were made as same as those of Example 4. The silver microparticles were recovered from the discharge fluid discharged from between the processing surfaces 1 and 2 by the same procedure as that of Example 4. The XRD measurement and the SEM observation thereof gave the almost same results as Example 4. It was confirmed that the particle diameter thereof was about 1 µm and that the uniform and homogeneous silver microparticles free from impurities could be produced. However, the production amount of the silver microparticles was 0.04 g/minute, which was about 1/10 as compared with Example 4. The temperature of the discharge fluid immediately after it was discharged from between the processing surfaces 1 and 2 was 21.0° C.

Example 5: Silver

In Example 5, Example 4 was repeated except that the discharge fluid discharged from between the processing surfaces 1 and 2 was recovered in one vessel for the period of 50 minutes in a similar manner to that of Example 4. During the recovery operation, the process was confirmed that the discharge fluid changed its state from slightly murky gray to dark gray; and after about 80 seconds from the start of the recovery operation, change of the color in the discharge fluid was not observed visually. The temperature of the discharge fluid at this time was 21.0° C. The silver microparticles were recovered by the same procedure as Example 4, and the XRD measurement and the SEM observation thereof were carried out. As a result of the XRD measurement, it was confirmed that homogeneous silver that was free from impurities could be obtained. From the SEM observation result, it was confirmed that the silver microparticle having the size of about 0.5 to about 2.5 µm could be obtained; however it was further confirmed that inhomogeneous microparticles having less homogeneity in particle diameter as compared with Example 4 were produced.

Comparative Example 5: Silver

In Comparative Example 5, 10 mL of the same raw material fluid (22.5° C.) as same as Example 4 was charged into a beaker containing 400 mL of the same reducing agent fluid as Example 4 having the temperature of 20.8° C. for the period of 1 minute with stirring. The color of the mixed solution immediately after all of 10 mL of the raw material fluid was charged into the beaker was slightly murky gray, which was then changed to dark murky gray. Sixty seconds after all of 10 mL of the raw material fluid was charged into the beaker, there was no color change visually in the mixed solution; and the temperature of the mixed solution at this time was 21.0° C. The silver microparticles were recovered by the same procedure as Example 4; and the XRD measurement and the SEM observation thereof were carried out. As a result of the XRD measurement, it was confirmed that homogeneous silver that was free from impurities could be obtained. From the SEM observation result, it was confirmed that the silver microparticles having the size of about 0.3 to about 5 μm was produced; however, it was further confirmed that inhomogeneous microparticles having further less homogeneity in particle diameter as compared with Example 4 and Example 5 were produced.

Example 6: Silver

In Example 6, as shown in FIG. 4 of the fluid processing apparatus, the vessel 61 to collect the discharge fluid was installed so as to be connected to the tubular vessel 62. The diameter and length of the tubular vessel each was set so as to give 30 seconds or longer as the residence time of the discharge fluid in the tubular vessel 62. Further, the tubular vessel 62 was put in the oil bath 65. The metal fluid and the reducing agent fluid were mixed in the thin film fluid formed between the processing surfaces 1 and 2 under the same conditions as Example 4 whereby discharging the fluid which contained the seed microparticles of the silver microparticles from between the processing surfaces 1 and 2 as the discharge fluid, whereby the discharge fluid was introduced continuously into the tubular vessel 62 through the introduction port 63 of the tubular vessel, and then it was discharged through the discharge port 64 of the tubular vessel. The discharge fluid was continuously discharged without stagnation in the vessel 61. The temperature of the oil bath 65 was set so as to give 21.0° C. or higher as the temperature of the discharge fluid that was discharged from the discharge port 64 of the tubular vessel. The discharge fluid that was introduced to the introduction port 63 of the tubular vessel was in the state of slightly murky gray, while the discharge fluid that was discharged from the discharge port 64 of the tubular vessel was dark murky gray in its color. The silver microparticles were recovered by the same procedure as that of Example 4; and the XRD measurement and the SEM observation thereof were carried out. Both results of the XRD measurement and the SEM observation showed the same results as those of Example 3; and it was confirmed that the particle diameter thereof was about 1 μm and that the uniform and homogeneous silver microparticles free from impurities could be produced. The production amount of the silver microparticles was 0.4 g/minute.

From the above results, it was found that when the silver microparticles are produced, if the method thereof includes two steps, that is, a step of separating seed microparticles of the silver microparticles in between the processing surfaces 1 and 2 in the fluid processing apparatus, and after the fluid which contains the separated seed microparticles of the silver microparticles is discharged from between the processing surfaces 1 and 2 as the discharge fluid, a step of growing the separated seed microparticles in the discharge fluid, then the production amount of the silver microparticles per unit time can be increased. Furthermore, it was found that when the fluid which contains the seed microparticles of the silver microparticles discharged from between the processing surfaces 1 and 2 is continuously introduced into the tubular vessel 62, the uniform and homogeneous silver microparticles that are grown to the prescribed particle diameter can be produced continuously.

Meanwhile, the effects including the shortened time necessary to grow the seed microparticles were observed when a mixer was installed inside the tubular vessel 62 so as to stir the discharge fluid that was introduced into the tubular vessel.

Examples: Silver Coating to Amorphous Silica

While a separating fluid (5.0% by weight of 2-dimethyl-aminoethanol/methanol solution) was introduced as the first fluid from the center with the supply pressure of 0.095 MPaG, the rotation number of 1700 rpm, the supply temperature of 25° C., and the supply rate of 100 mL/minute, a raw material fluid (5% by weight of aqueous sodium silicate) was introduced as the second fluid with the supply temperature of 25.0° C. and the supply rate of 10 mL/minute, the both fluids being introduced into between the processing surfaces 1 and 2, whereby the first fluid and the second fluid were mixed in the thin film fluid. The seed microparticles of silica in the amorphous state (hereinafter, this is called as amorphous silica) were separated between the processing surfaces 1 and 2. Each of the supply temperatures of the first fluid and the second fluid was measured just before introduction of each of the first fluid and the second fluid into the processing apparatus (in more detail, just before introduction into between the processing surfaces 1 and 2). The dispersion solution of the amorphous silica seed microparticles was discharged from between the processing surfaces 1 and 2 as the discharge solution. The temperature of the discharge solution was 25.0° C. The particle diameter of the amorphous silica contained in the discharge solution immediately after it was discharged from between the processing surfaces 1 and 2 was about 200 nm as a result of the TEM observation.

Examples 7: Silver Coating to Amorphous Silica

In Example 7, as shown in FIG. 4 of the fluid processing apparatus, the vessel 61 to collect the discharge fluid was installed so as to be connected to the tubular vessel 62. The 0.0166% by weight of aqueous silver nitrate solution with the temperature of 60.0° C. was charged into the vessel 61 at the rate of 10 mL/minute from the opening part 67 of the supply equipment 66 of FIG. 4. The aqueous silver nitrate solution and the discharge solution which contained the amorphous silica seed microparticles discharged from between the processing surfaces 1 and 2 under the conditions mentioned above were continuously introduced from the introduction port 63 of the tubular vessel into the tubular vessel 62, and they were discharged from the discharge port 64 of the tubular vessel. The discharge solution and the aqueous silver nitrate solution (hereunder they are called as the mixed solution) were continuously discharged without stagnation in the vessel 61. The diameter and length of the tubular vessel each was set so as to give 30 seconds or longer as the residence time of the mixed solution in the tubular vessel 62. Further, the tubular vessel 62 was put in the oil bath 65. The temperature of the oil bath 65 was set so as to give 25° C. as the temperature of the mixed solution that was discharged from the discharge port 64 of the tubular vessel. The mixed solution that was introduced to the introduction port 63 of the tubular vessel was a slightly murky gray fluid, while the mixed solution that was discharged from the discharge port 64 of the tubular vessel was a murky gray fluid. Thereafter, in order to recover the microparticles, the mixed solution was allowed to stand at room temperature to settle the microparticles; then after the supernatant thereof was removed, washing by pure water was done for three times, and the remaining solid was dried under an atmospheric pressure at 25° C. The XRD measurement and the TEM observation of the microparticles after drying were carried out. From both results of the XRD measurement and the TEM observation, it was confirmed that surface of the homogeneous amorphous silica seed microparticles having the size of about 200 nm was coated by silver with the thickness thereof being about 10 nm.

Comparative Example 6: Silver Coating to Amorphous Silica

In Comparative Example 6, 10 mL of the same raw material fluid (25° C.) as Example 7 was charged into a beaker containing 100 mL of the same separating fluid as Example 7 with the temperature of 25° C. for the period of 1 minute with stirring. The amorphous silica was separated. Then, 10 mL of the same aqueous silver nitrate solution (60° C.) as Example 7 was charged into the beaker for the period of 1 minute. The color of the mixed solution immediately after all of 10 mL of the aqueous silver nitrate solution was charged into the beaker was a slightly murky gray fluid, which was then changed to the state of a murky gray. Thirty seconds after all of 10 mL of the aqueous silver nitrate solution was charged into the beaker, there was no color change visually in the mixed solution; and the temperature of the mixed solution at this time was 25° C. The microparticles were recovered by the same procedure as Example 7; and the XRD measurement and the TEM observation thereof were carried out. From both results of the XRD measurement and the TEM observation, it was confirmed that the amorphous silica microparticles having the size of about 50 to 400 nm and the silver microparticles having the size of about 5 to 100 nm were present independently with each other.

From the above results, in the case of coating the surface of the seed microparticles with other material, too, it was found that if the method thereof includes two steps, that is, a step of separating the seed microparticles capable of becoming the nuclei thereof between the processing surfaces 1 and 2, and after the fluid which contains the seed microparticles capable of becoming the nuclei thereof is discharged from between the processing surfaces 1 and 2 as the discharge fluid, a step of mixing the discharge fluid with the fluid which contains the other material whereby separating the other material onto the surface of the separated seed microparticles for coating, then the uniform coating can be made. Furthermore, it was found that when the fluid containing the seed microparticles capable of becoming the nuclei thereof which is discharged from between the processing surfaces 1 and 2 and the fluid which contains the other material are continuously introduced into the tubular vessel 62, the coated microparticles having the other material separated on surface of the seed microparticles can be produced continuously.

1 first processing surface
2 second processing surface
10 first processing member
11 first holder
20 second processing member
21 second holder
d1 first introduction part
d2 second introduction part
d20 opening
61 vessel
62 tubular vessel
63 introduction port of tubular vessel
64 discharge port of tubular vessel
65 temperature controlling mechanism, oil bath
66 supply equipment
67 opening part

The invention claimed is:

1. A method for producing a microparticle wherein the method comprises at least two steps as following:
   (I) a first step of precipitating a seed microparticle in a thin film fluid formed between at least two processing surfaces which are disposed in a position they are faced with each other so as to be able to approach to and separate from each other, at least one of which rotates relative to the other, whereby discharging a fluid which contains the seed microparticle thus precipitated as a discharge fluid, and
   (II) a second step of growing the precipitated seed microparticle in the discharge fluid whereby obtaining a prescribed microparticle,
   wherein in the second step, into a tubular vessel having an introduction port in one end and a discharge port in other end, the discharge fluid is introduced from the introduction port, whereby growing the seed microparticle in the tubular vessel, and
   wherein the first step and the second step are executed continuously.

2. The method for producing a microparticle according to claim 1 wherein the prescribed microparticle is a crystalline microparticle and the seed microparticle is a crystalline microparticle.

3. The method for producing a microparticle according to claim 1 wherein the prescribed microparticle is a crystalline microparticle and the seed microparticle is a crystal nucleus.

4. A method for producing a microparticle wherein
   the method is to mix a raw material fluid in which at least one substance to be precipitated is dissolved or molecular dispersed in a solvent with a precipitating fluid to precipitate the substance to be precipitated, whereby precipitating the substance to be precipitated,
   the method comprises at least two steps as following:
   (I) a first step in which the raw material fluid is mixed with the precipitating fluid in a thin film fluid formed between at least two processing surfaces which are disposed in a position they are faced with each other so as to be able to approach to and separate from each other, at least one of which rotates relative to the other, whereby precipitating a seed microparticle of the substance to be precipitated and discharging a fluid which contains the seed microparticle thus precipitated as a discharge fluid, and
   (II) a second step of growing the precipitated seed microparticle in the discharge fluid whereby obtaining a prescribed microparticle,
   wherein in the second step, into a tubular vessel having an introduction port in one end and a discharge port in other end, the discharge fluid is introduced from the introduction port, whereby growing the seed microparticle in the tubular vessel, and
   wherein the first step and the second step are executed continuously.

5. The method for producing a microparticle according to claim 4 wherein
   the raw material fluid is a metal fluid in which at least one metal and/or metal compound is dissolved in a solvent as the substance to be precipitated, the precipitating fluid is a reducing agent fluid which contains at least one reducing agent, and the prescribed microparticle is a metal microparticle.

6. The method for producing a microparticle according to claim 1, wherein a mixer is installed inside the tubular vessel whereby mixing the fluids in the tubular vessel.

7. The method for producing a microparticle according to claim 1 wherein in the second step, the discharge fluid is mixed with a fluid which contains a substance other than the substance of the seed microparticle precipitated, thereby precipitating the other substance on surface of the seed microparticle.

8. The method for producing a microparticle according to claim 1, wherein a temperature controlling mechanism is installed in the tubular vessel thereby controlling temperature of the fluid in the tubular vessel.

9. The method for producing a microparticle according to claim 1, wherein by adjusting length and/or diameter of the tubular vessel, a residence time of the fluid in the tubular vessel is controlled.

10. The method for producing a microparticle according to claim 2 wherein in the second step, the discharge fluid is mixed with a fluid which contains a substance other than the substance of the seed microparticle precipitated, thereby precipitating the other substance on surface of the seed microparticle.

11. The method for producing a microparticle according to claim 3 wherein in the second step, the discharge fluid is mixed with a fluid which contains a substance other than the substance of the seed microparticle precipitated, thereby precipitating the other substance on surface of the seed microparticle.

12. The method for producing a microparticle according to claim 4 wherein in the second step, the discharge fluid is mixed with a fluid which contains a substance other than the substance of the seed microparticle precipitated, thereby precipitating the other substance on surface of the seed microparticle.

13. The method for producing a microparticle according to claim 5 wherein in the second step, the discharge fluid is mixed with a fluid which contains a substance other than the substance of the seed microparticle precipitated, thereby precipitating the other substance on surface of the seed microparticle.

14. The method for producing a microparticle according to claim 1, wherein a space between the at least two processing surfaces is kept at a prescribed distance by a balance between a surface-approaching pressure and a force to separate the at least two processing surfaces from each other.

15. The method for producing a microparticle according to claim 4, wherein a space between the at least two processing surfaces is kept at a prescribed distance by a balance between a surface-approaching pressure and a force to separate the at least two processing surfaces from each other.

16. The method for producing a microparticle according to claim 1, wherein in the first step, precipitation of the seed microparticle is performed under a condition of laminar flow in the thin film fluid.

17. The method for producing a microparticle according to claim 4, wherein in the first step, a raw material fluid and a precipitating fluid are mixed under a condition of laminar flow in the thin film fluid to precipitate the seed microparticle.

18. The method for producing a microparticle according to claim 1, further comprising:

compared to a case of growing the seed microparticle between the processing surfaces, the seed microparticle being precipitated between the processing surfaces, discharging and obtaining a processing microparticle, shortening a residence time of the fluid containing the seed microparticle between the processing surfaces, thereby increasing a product amount of the prescribed microparticle as well as increasing a flow amount for processing a certain time in a fluid processing apparatus provided with the processing surfaces.

19. The method for producing a microparticle according to claim 4, further comprising:

compared to a case of growing the seed microparticle between the processing surfaces, the seed microparticle being precipitated between the processing surfaces, discharging and obtaining a processing microparticle, shortening a residence time of the fluid containing the seed microparticle between the processing surfaces, thereby increasing a product amount of the prescribed microparticle as well as increasing a flow amount for processing a certain time in a fluid processing apparatus provided with the processing surfaces.

* * * * *